United States Patent Office 2,744,001
Patented May 1, 1956

2,744,001

POLISHING MATERIAL AND METHOD OF MAKING SAME

Cameron G. Harman and Ralph Rose, Columbus, Ohio, assignors, by mesne assignments, to Rare Earths, Incorporated, Pompton Plains, N. J., a corporation No Drawing. Application September 8, 1950, Serial No. 183,911

11 Claims. (Cl. 51—308)

This invention relates to an improved polishing material adapted for use in polishing glass or glass-like materials, and to a process of preparing such a polishing material.

Finely divided red iron oxide, known commercially as "red rouge," has been used in the polishing of glass and glass-like articles where a highly polished glass surface is desired. The disadvantage of such a polishing material, either in the natural form or when artificially prepared, is that the polishing rate is rather slow. Moreover, "red rouge" is extremely difficult material to use because it stains the person and clothing of the workers, and is generally obnoxious in the working area.

Certain siliceous materials, principally quartz, commercially available as "white rouge", have also been proposed as polishing materials for glass where a highly polished glass surface is desired. However, "white rouge" has a rather low polishing efficiency, not equivalent to "red rouge."

In addition, there are commercially available certain of the rare earth oxides, which are very good polishing materials, but which are quite expensive.

This invention is based upon the discovery that vitreous silica is an excellent polishing material. Another aspect of this invention is that mixtures of vitreous silica and rare earth oxides produce a polishing material which is far superior to any polishing material now available and which is unexpectedly superior to either of the two component materials, when used alone. The abrasive power of a mixture of vitreous silica and rare earth oxides is far superior to the abrasive power of either of these materials, singly, and vitreous silica alone has a much better polishing efficiency than "white rouge" or "red rouge."

It is, therefore, one object of this invention to provide an improved polishing material.

It is another object of this invention to provide a method of making such a polishing material.

It is still another object of this invention to provide a polishing material which is economical to use, and which has a polishing efficiency far superior to any commercially available polishing material.

It is a further object of this invention to provide a method of making such a polishing material.

Various additional objects and advantageous features of the present invention will become apparent upon reading the following description.

The chemical compound silica ($SiO_2$) exists in four distinct forms. These forms are:
1. Quartz
2. Tridymite
3. Cristobalite
4. Vitreous silica, which is an amorphous silica, and which is also known as silica glass, fused silica, or fused quartz.

Silica, in the form of quartz, tridymite, or cristobalite, is a crystalline material, and though all three of these forms of silica have the same chemical composition, each has a different crystal form, and each is distinguishable over the other by such properties as density, index of refraction, and crystal habits.

Quartz may exist as low-quartz or high-quartz. Tridymite may exist as low-tridymite, high-tridymite, or upper high-tridymite. Cristobalite may exist as low-cristobalite or high-cristobalite. Only low-quartz is stable at atmospheric temperature. Low-tridymite and low-cristobalite are capable of existence at atmospheric temperatures, but are in a metastable state with respect to low-quartz. They tend to convert to the low-quartz form of silica. This conversion to low-quartz is very slow and is not even measurable in terms of years. The low-quartz form is the form in which silica is usually found in nature.

Vitreous silica, which is an amorphous silica, is also known as silica glass, fused silica, and fused quartz. Vitreous silica can exist at atmospheric temperatures, but is unstable at temperatures below about 1710° C. Vitreous silica is characterized by isotropic (nondirectional) properties, low density, low thermal expansion, low index of refraction, and absence of crystallinity. Vitreous silica is characterized further by its lack of porosity or capillarity, as evidenced by nonpenetration of dyes, and by the absence of water in is internal structure.

Unfortunately, the nomenclature of this art is somewhat indefinite. Many naturally occurring deposits of silica, which on macro-inspection appear to be without regular crystalline form, are often referred to as "amorphous silica," while in reality, such deposits of silica are crypto-crystalline masses of low-quartz, thus, misleading the person not familiar with the materials, and/or the nomenclature.

While vitreous silica is an amorphous silica, the term vitreous silica, as used in this specification, does not include such crypto-crystalline masses of low-quartz. Also, not to be included within the term vitreous silica, as used herein, are other forms of silica sometimes referred to as amorphous silica, which come from both synthetic and natural sources, and which are similar to vitreous silica in some respects, but which are very unlike it in other respects. For instance, as examples of material sometimes referred to as amorphous silica, which are not to be included within the term vitreous silica as used herein, are the finely divided amorphous varieties, such as precipitated silica and naturally occurring hydrated amorphous silica.

The finely divided amorphous varieties, such as precipitated silica, may be prepared chemically from a basic silicate, such as sodium silicate, by the addition of hydrochloric acid. They may be deposited from a vapor, for example, by passing silicon tetrafluoride vapors through water. Such amorphous varieties of precipitated silica usually contain water, and thus are different from vitreous silica as defined herein, which contains no water. Moreover, such amorphous materials as precipitated silica, if heated high enough to remove their water, still differ physically from vitreous silica by reason of their porosity, one of their principal uses being that of a desiccant.

The naturally occurring hydrated amorphous silicas also differ from vitreous silica. These hydrated silicas are usually classed as opal, or opaline varieties of silica. This variety of silica, though by no means rare in nature, constitutes a very small part of the naturally occurring silicas with respect to the abundance of silica that occurs as the low-quartz form.

Naturally occurring hydrated amorphous silica differs from vitreous silica in that it is usually much more porous than vitreous silica. It is comparable to materials such as precipitated silica as to the degree of porosity.

The invention constituting a part of the subject matter of this application is based upon the discovery that vitreous silica, as defined and limited herein, is an exceptionally fine polishing material.

As previously stated, vitreous silica has a high polishing efficiency as compared with "white rouge" or "red rouge". To illustrate the increased polishing efficiency of vitreous silica as compared with "red rouge" and "white rouge", the following example is given. It is to be understood that this example is illustrative in nature and should in no way be construed as a limitation on the scope of the disclosure herein.

Example I 50 grams of the polishing material in 100 cc. of water were gradually added to a 1⅞ inch spectacle lens blank on a standard polishing wheel. Every thirty seconds, the polishing was interrupted, the lens blank was removed, cleaned, and examined under a clear glass incandescent lamp. Starting with a spectacle lens in a "fined" condition, and using vitreous silica as the polishing agent, a highly polished, brilliant surface, containing no pits or lines, was obtained in six minutes. Under the same test conditions, it took slightly more than ten minutes to produce a comparable polished surface with red rouge, and even longer to produce a surface of the same quality, with white rouge.

Consequently, it should be apparent that vitreous silica is an effective polishing material which is far superior in polishing efficiency to "white rouge" or "red rouge". While vitreous silica is a superior polishing material for polishing glass or glass-like surfaces, where a highly polished surface is desired, and while this is one aspect of this invention, it has been discovered that mixtures of vitreous silica and rare earth oxides produce a polishing material that is superior to either vitreous silica alone or the rare earth oxides alone.

To illustrate the unexpectedly superior polishing efficiency of a mixture of vitreous silica and rare earth oxides, the following example is given. It is to be understood that this example is merely illustrative and should in no way be construed as a limitation on the scope of the disclosure herein.

The abrasive power is based on a well known test for polishing materials and represents the milligrams of glass removed from a 1⅞ inch spectacle lens blank in 10 minutes, using a standard M422A bowl feed polisher made by the American Optical Company, with the gradual addition of 50 grams of the polishing material in 100 cc. of water.

Example II

| Polishing material: | Abrasive power |
|---|---|
| Vitreous silica | 84 |
| Rare earth oxides | 96 |
| 64.5% vitreous silica | } 165 |
| 35.5% rare earth oxides | |

While almost any addition of the rare earth oxides to vitreous silica produces such an unexpected increase in abrasive power and results consequently in an extremely fine polishing material, and while the combination of these two materials is considered to be the broad aspect of a part of this invention, it is preferred to incorporate rare earth oxides in the combination of vitreous silica and rare earth oxides in an amount corresponding to, at least, 20% by weight of the total mixture. Moreover, the preferred embodiment of a mixture of these two materials comprises 35.5% rare earth oxides and the balance vitreous silica.

While any of the rare earth oxides or any combination of rare earth oxides, when added to vitreous silica, produce a polishing material having such unexpected and improved polishing efficiency, the rare earth oxides that are formed from the cerium-group rare earths that naturally occur in monazite sands are the preferred rare earth oxides. The majority of such oxides is cerium oxide, while the balance comprises various other rare earth oxides.

It is to be understood that any combination of vitreous silica and rare earth oxides as above defined is useful as a polishing material having an unexpectedly improved polishing efficiency. Moreover, while a preferred range has been set forth and a preferred exact composition has also been set forth, it is to be further understood that the most preferred embodiment of the combination of vitreous silica and rare earth oxides includes limitations as to the particle size of these materials. Therefore, in all of the above combinations of vitreous silica and rare earth oxides, or in the disclosure relating to vitreous silica, per se, it is preferred that 75% of the vitreous silica have a particle size of less than 5 microns, the remainder being between 5 and 20 microns in particle size.

It is also preferred that 60% of the rare earth oxides have a particle size less than 5 microns, 15% of the rare earth oxides have a particle size from 5 to 10 microns, and the remainder have a particle size from 10 to 20 microns.

Vitreous silica, as defined herein, may be made in two ways. As a first method, any of the various amorphous silicas may be heated in order to remove their water of hydration and eliminate their porosity so as to form vitreous silica. This is essentially a relatively low temperature process. As a second method, vitreous silica, as defined and used herein, may also be formed by heating any form of relatively pure silica above its melting point, and cooling the melted mass very rapidly to form vitreous silica, which is thereafter comminuted.

The first described method is the preferred method. The exact temperature to which the amorphous silica in this method is heated and the time that it is held at that temperature varies with the purity of the starting amorphous silica material. The temperature range, however, is between approximately 1800° F. and 2200° F. Depending upon the purity of the starting material, the exact time that the material is held at a particular temperature and the particular temperature employed in each instance are critical in producing an optimum quantity of vitreous silica. For example, using a relatively pure amorphous silica, i. e., silica gel, the optimum heat treatment was at 2000° F. for a period of one hour. Above this temperature cristobalite tended to form. Below this temperature, the silica gel did not entirely change to the desired vitreous silica. When the starting material is relatively impure, the time and temperature must be adjusted in order to produce an optimum quantity of vitreous silica. For example, in order to produce an optimum amount of vitreous silica, an impure silica gel which contained some flux was heated for a period of one hour at a temperature of 1900° F. This temperature and heat treatment produced the optimum amount of vitreous silica from this type of material.

The polishing material comprising vitreous silica and rare earth oxides may be made in one of two ways. The vitreous silica and rare earth oxides may be mechanically mixed. However, a preferable method is to mix an amorphous silica and a salt of the rare earths and then calcine such a mixture. This latter method is preferable because it produces a polishing material which, when used in polishing glass, results in the production of a slightly better finish on the glass article being polished.

In the performance of this second method, the raw materials are thoroughly mixed, wet or dry, to form a homogeneous batch. If the materials are mixed wet, dewatering prior to calcination may be done by any of the methods commonly used in the chemical industry. The mixed batch is then calcined at a temperature that will convert the amorphous silica to vitreous silica and the salt of the rare earth to the rare earth oxide.

In the performance of this method, the preferred salt of the rare earth or rare earths employed is the basic sulfate. However, other salts of the rare earths such as the nitrates, oxalates, or others, which on calcination will produce the rare earth oxide, are satisfactory. As previously pointed out, the calcining temperature will vary, depending upon the composition and purity of the material. However, it may be generally stated that the calcining temperature should be high enough to convert the salt of the rare earth to the rare earth oxide, but not so high as to form cristobalite from the amorphous silica starting material.

From the foregoing, it should be apparent that there has been devised a polishing material which is extremely efficacious for the polishing of glass or glass-like objects where a highly polished surface is desired. This material, vitreous silica, moreover, when supplemented by the addition of a rare earth oxide or a combination of rare earth oxides produces a polishing material having a polishing efficiency, as evidenced by its abrasive power, far superior to the polishing efficiency of either vitreous silica alone or the rare earth oxides alone.

Furthermore, novel methods of making such polishing materials have also been disclosed.

While the above invention has been described in its preferred embodiment, it is to be understood that the words used are words of description rather than of limitation, and that changes within the purview of the appended claims may be made without departing from the true scope and spirit of the invention.

What is claimed is:

1. A polishing material consisting essentially of vitreous silica and a rare earth oxide.
2. A polishing material consisting essentially of at least 20% by weight of a rare earth oxide, the balance being vitreous silica.
3. A polishing material consisting essentially of 35.5% rare earth oxides and the balance vitreous silica.
4. A polishing material consisting essentially of vitreous silica and those cerium-group rare earth oxides that naturally occur in monazite sands as salts of the rare earths.
5. A polishing material consisting essentially of vitreous silica and rare earth oxides, the majority of said oxides being cerium oxide.
6. A polishing material consisting essentially of at least 20% by weight of rare earth oxides, and the balance vitreous silica; the majority of said oxides being cerium oxide.
7. A polishing material consisting essentially of vitreous silica and a rare earth oxide; at least 75% of said vitreous silica having a particle size less than 5 microns, the balance being between 5 and 20 microns in particle size, and at least 60% of said rare earth oxide having a particle size less than 5 microns and the remainder of said rare earth oxide having a particle size from 5 to 20 microns.
8. A polishing material consisting essentially of at least 20% rare earth oxides, and the balance vitreous silica; at least 75% of said vitreous silica having a particle size of less than 5 microns, the remainder being between 5 and 20 microns in particle size; and at least 60% of the rare earth oxides having a particle size less than 5 microns, the balance of said rare earth oxides having a particle size from 5 to 20 microns.
9. The method of making a polishing material which comprises mixing an amorphous silica and salts of rare earths which upon heating will produce rare earth oxides, and thereafter heating said mixture to a temperature from approximately 1800° F. to approximately 2200° F. to produce vitreous silica and rare earth oxide.
10. The method of making a polishing material which comprises mixing amorphous silica and a salt of the rare earth which upon heating will produce the rare earth oxide, and heating said mixture at a temperature from approximately 1800° F. to approximately 2200° F. which will convert said salt to the rare earth oxide and will convert amorphous silica to vitreous silica, but will not form cristobalite from said amorphous silica.
11. The method of making a polishing material which comprises mixing amorphous silica with the basic sulfate salts of the rare earths, and heating said mixture at a temperature from approximately 1800° F. to approximately 2200° F. which will convert said sulfates to oxides and will convert amorphous silica to vitreous silica, but will not form cristobalite from said amorphous silica.

References Cited in the file of this patent

UNITED STATES PATENTS

| Number | Name | Date |
|---|---|---|
| 1,563,853 | Harty | Dec. 1, 1925 |
| 1,637,439 | Coblentz | Aug. 2, 1927 |
| 1,819,356 | Church | Aug. 18, 1931 |
| 2,000,240 | Long | May 7, 1935 |
| 2,313,566 | McGregor | Mar. 9, 1943 |
| 2,408,167 | Hepp | Sept. 24, 1946 |
| 2,445,901 | Ambrose | July 27, 1948 |
| 2,448,270 | Marisic | Aug. 31, 1948 |
| 2,449,050 | Bond et al. | Sept. 14, 1948 |
| 2,450,433 | Leeman | Oct. 5, 1948 |
| 2,554,070 | Stead | May 22, 1951 |